US012692189B2

(12) United States Patent
Nguyen et al.

(10) Patent No.: US 12,692,189 B2
(45) Date of Patent: Jul. 28, 2026

(54) LOW-TEMPERATURE FABRICATION METHOD OF BULK METAMATERIAL STRUCTURES FOR HEAT-SENSITIVE MATERIALS

(71) Applicant: Lawrence Livermore National Security, LLC, Livermore, CA (US)

(72) Inventors: Hoang T. Nguyen, Livermore, CA (US); Candis Alexandra Jackson, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 118 days.

(21) Appl. No.: 18/503,922

(22) Filed: Nov. 7, 2023

(65) Prior Publication Data

US 2025/0145518 A1      May 8, 2025

(51) Int. Cl.
*C03C 15/00*          (2006.01)
(52) U.S. Cl.
CPC .................................... *C03C 15/00* (2013.01)
(58) Field of Classification Search
None
See application file for complete search history.

(56) References Cited

U.S. PATENT DOCUMENTS

| | | | | |
|---|---|---|---|---|
| 4,407,695 | A * | 10/1983 | Deckman | ................. B41M 5/24 |
| | | | | 257/E21.232 |
| 6,177,351 | B1 * | 1/2001 | Beratan | ............ H01L 21/76855 |
| | | | | 257/E21.585 |
| 9,017,566 | B2 * | 4/2015 | Lander | .................... C03C 15/00 |
| | | | | 216/49 |
| 2009/0114618 | A1 * | 5/2009 | Zhang | ........................ G03F 7/09 |
| | | | | 430/323 |
| 2016/0254395 | A1 * | 9/2016 | Jiang | ..................... H10F 77/707 |
| | | | | 257/76 |
| 2018/0050959 | A1 * | 2/2018 | Dirks | .................. C03C 17/3435 |
| 2018/0138047 | A1 * | 5/2018 | Atikian | ............... B81C 99/0095 |
| 2021/0026150 | A1 * | 1/2021 | Feigenbaum | ........ G02B 5/3083 |
| 2022/0163810 | A1 * | 5/2022 | Weinstein | ............ G02B 27/106 |
| 2022/0372556 | A1 * | 11/2022 | Mahshid | ................ G01N 21/25 |
| 2023/0221463 | A1 * | 7/2023 | Sun | ........................ G02B 1/002 |
| | | | | 359/726 |

OTHER PUBLICATIONS

Bukhari et al., "A Metasurfaces Review: Definitions and Applications," *Applied Sciences*, vol. 9, 2727, 14 pages (2019).

(Continued)

*Primary Examiner* — Shamim Ahmed
(74) *Attorney, Agent, or Firm* — Knobbe, Martens, Olson & Bear, LLP

(57)          ABSTRACT

A method of fabricating metamaterial structures without exceeding 30° C. or less in temperature comprises forming a metasurface mask by depositing a layer of nanoparticles on a surface of the substrate, etching the surface of the substrate with the nanoparticles thereon using reactive ion beam etching (RIBE), and removing at least a portion of the nanoparticles from the etched surface. Nanometer size surface features are thereby formed on the surface of a material without exceeding 30° C. in temperature, thereby forming metamaterial structures with a reduced incidence of thermal damage to the material.

20 Claims, 7 Drawing Sheets

(56)                    References Cited

OTHER PUBLICATIONS

Holloway et al., "An Overview of the Theory and Applications of Metasurfaces: The Two-Dimensional Equivalents of Metamaterials," *IEEE Antennas and Propogation Magazine*, vol. 54, No. 2, pp. 10-35 (Apr. 2012).

Ladumor et al., "Graphene-based C-shaped metasurface broadband solar absorber," *Proc. of SPIE*, vol. 11274, 1127405, 6 pages (2020).

"Measurements: Langmuir & Langmuir Blodgett," https://web.archive.org/web/20230601223227/https://www.biolinscientific.com/measurements/langmuir-and-langmuir-blodgett, Jun. 1, 2023, 11 pages.

"What is a Langmuir-Blodgett film?," Biolin Scientific, https://www.biolinscientific.com/blog/what-is-a-langmuir-blodgett-film, Aug. 30, 2022, 8 pages.

* cited by examiner

LOW-TEMPERATURE FABRICATION METHOD OF BULK METAMATERIAL STRUCTURES FOR HEAT-SENSITIVE MATERIALS

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field

The present disclosure relates generally to metamaterial structures such as bulk metamaterial structures, and more specifically to methods of fabricating metamaterial structures at low temperatures such as 30° C. or less as well as the metamaterial structures thereby produced.

Description of the Related Art

Various optical metamaterials comprise patterned structures that interact with light and alter the light properties over a sub-wavelength thickness. Such nanostructures can resonantly capture the light and re-emit it with a defined phase, polarization, modality, and/or spectrum, thus allowing the tailoring of light waves with unprecedented accuracy. This ability to manipulate light at the nanoscale level has opened a plethora of practical applications including spectral selectivity, wavefront and polarization control, and the control of light radiation and detection. Bulk metamaterial structures comprise nanometer scale features that are primarily integrated into the material volume (as opposed to metasurfaces, which are primarily at the surface). The structures have sub-wavelength dimensions for the incident waves to "see" or interact with them as a single material. In other words, the unit cell of an individual structure may be small enough to diffract only the zeroth order. In contrast, larger unit cells, for example, approaching the size of the incident wavelength, would induce optical loss due to diffraction into higher diffraction orders.

In some cases, the material in which the bulk metamaterial structures are to be formed may be heat-sensitive. Exposure of these materials to excess temperatures may, for example, alter the material's composition, cause thermal shock, or even permanently damage the material.

Unfortunately, various methods of forming bulk metamaterials and metamaterial structures involve high temperatures processes, or at least processes having a temperature sufficiently high to alter the properties of the material in a manner that is not desirable for the intended use.

What is needed, therefore, is a low-temperature method for fabrication of bulk metamaterial structures on or in heat-sensitive materials.

SUMMARY

The present disclosure relates generally to methods for fabricating metamaterial structures such as bulk metamaterial structures at 30° C. or below. The method may comprise, for example, forming a metasurface mask by depositing a layer of nanoparticles on a surface of a substrate, etching the surface with the nanoparticles thereon using reactive ion beam etching (RIBE), thereby forming surface features on the surface, and removing at least a portion of the nanoparticles from the etched surface.

In various implementations, the nanoparticles comprise spheres such as polystyrene spheres. In some implementations, the nanoparticles are deposited using a spin-on process. In some implementations, the nanoparticles are deposited using a Langmuir (L), Langmuir-Blodgett (LB) or Langmuir-Schaefer (LS) process. In some cases, the nanoparticle spheres are removed by washing.

Other methods or variations are possible.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
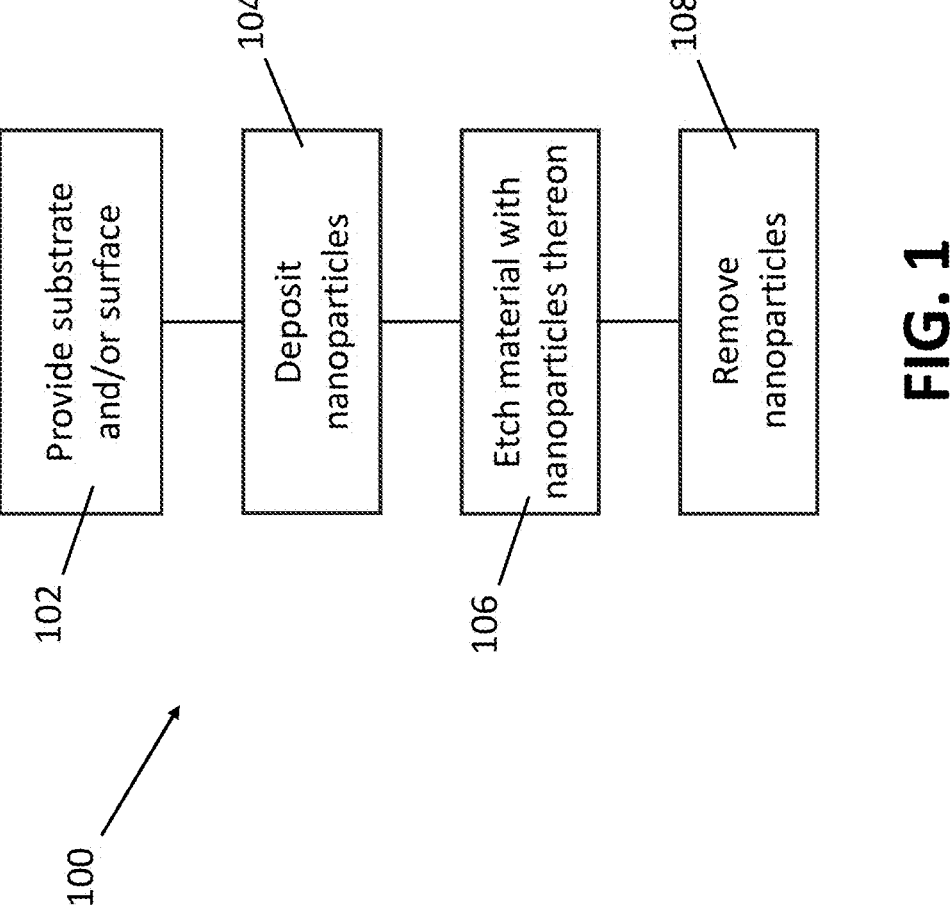
FIG. 1 is a block diagram illustrating a method of fabricating a metamaterial structure such as a bulk metamaterial structure.

As described above, various metasurface fabrication technologies utilize processes that are incompatible with heat-sensitive materials that cannot be exposed to temperatures greater than 30° C. (86° F.). Such fabrication technology may, for example, include two main components, (1) metasurface mask generation and (2) pattern transfer, both of which may involve high temperature processing.

Metasurface mask generation can include, for example, lithography and deposition techniques. In various implementations, lithography comprise a patterning process in which a photosensitive polymer is selectively exposed to light that leaves a latent image in the polymer that can then be selectively dissolved to provide patterned access to an underlying layer. Openings in the polymer layer permit regions of the underlying layer to be etched away while portions of the underlying layer covered by the polymer are protected from the etch process. The polymer layer can be subsequently removed leaving the patterned underlying layer. The photosensitive polymer coating may, however, involve a cure temperature of greater than 90° C.

Additionally, in various applications, a bottom antireflective coating is disposed between the photosensitive polymer and the underlying layer to reduce or minimize back-reflections of the lithography light that can degrade, interfere with, or prevent the patterning process. The bottom antireflective coating may involve cure temperatures greater than 170° C. to curtail intermixing with the photoresist.

Metasurface mask generation can also be accomplished using metal deposition in conjunction with layer lift-off or shadow mask techniques. Metal deposition may comprise a physical vapor method in which raw material is vaporized and then condensed onto the surface. Examples of physical vapor deposition are electron beam, ion beam sputtering, magnetron sputtering, and plasma chemical vapor to name a few. Example process temperatures for physical vapor deposition coatings can be between 250° C. and 450° C.

Pattern transfer can be accomplished by using the metasurface mask to fabricate the metasurface structure in the bulk material via plasma etching. Plasma etching is the removal of material via a plasma. A sample is treated with an appropriate plasma gas mixture pulsed at a sample. The plasma source, known as etch species, can be, for example, charged (ions) or neutral (atoms and radicals). Examples of plasma etching systems include reactive ion etching (RIE), inductively coupled plasma etching (ICP), and plasma enhanced etching (PE). Plasma etching can involve temperatures in the range from 200-400° C.

RIE, ICP, and PE configurations may, for example, include a cathode on which the samples are mounted and to which rf power is capacitively coupled. The rf power causes a discharge between the anode and the cathode. A dark space, across which the ions are accelerated, develops adjacent to the cathode. Owing to the different mobilities of the ions and electrons in the discharge, the cathode acts as a diode and charges the coupling capacitor to the peak value of the rf input voltage. This results in a dc bias at the cathode. Because the sample is placed in a field between the anode and cathode, sample temperatures can vary.

Exposing heat sensitive materials such as materials for piezoelectric and MEMS devices and assemblies and magnetic sensors, non-linear optical crystals, laser glass or solid-state laser materials, etc., to excess temperatures may cause problems. Exposure to excess temperatures can, for example, alter the material's composition, cause thermal shock, or even permanently damage the material.

Described herein is a low-temperature method of fabricating metamaterial structures such as bulk metamaterial structures for heat sensitive materials at temperatures at or below 30° C. The fabrication method may include the combination of (1) a low-temperature metasurface mask generation with (2) a low-temperature pattern transfer process.

FIG. 1 is a block diagram that schematically illustrates a process 100 for fabricating metamaterial structures such as bulk metamaterial structures. As shown in block 102, heat-sensitive material is provided for forming the metamaterial structures therein. The material may comprise, for example, glass or non-linear optical crystals. The material may comprise laser glass or solid-state laser materials. The material may be piezoelectric and/or be part of, for example, microelectromechanical systems (MEMS) or magnetic sensors. Other materials and applications are also possible. The heat-sensitive material may comprise, for example, a substrate or a layer of material such as on the substrate. The treatment may be directed to a surface of the material such as a surface of the substrate or a surface of a layer of material on a substrate.

As shown in block 104, nanoparticles are deposited on the material, for example, on the surface of the material. The nanoparticles have a nanometer dimension or dimensions (e.g., width, height, diameter, or any combination thereof).

As shown in block 106, the material having the nanoparticles thereon is etched. Regions on the surface of the material covered by the nanoparticles are not etched, while regions on the surface of the material covered by the nanoparticles are etched. Topographical surface features will thereby be formed on the surface of the material.

As shown in block 108, nanoparticles are removed from the surface of the material. The topographical or surface features remain on the surface of the material.

In various implementations, the material comprises bulk material. Formation of the surface features in the material create metamaterial structures in the material, for example, bulk metamaterial structures in the bulk material. These metamaterial structures have a nanometer dimension or dimensions, such as width, heights, diameters, spacing, period, etc., or any combination thereof, such that the metamaterial structures will interact with light.

Figures 2A, 2B, 2C, 2D:
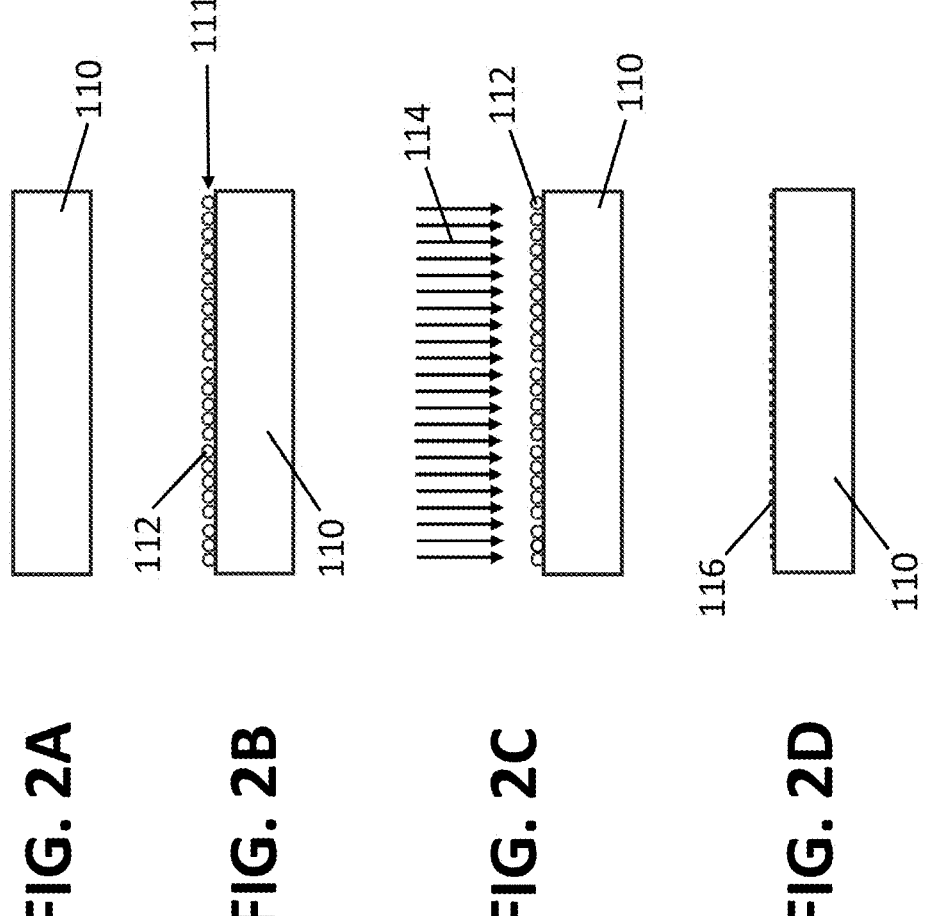
FIGS. 2A-2D are schematic cross-sectional views illustrating a process of fabricating a bulk metamaterial structure. The process may include, for example, depositing a layer of polystyrenes spheres on a surface of a bulk material and etching the surface using a Reactive Ion Beam Etching (RIBE).

FIGS. 2A-2D are schematic cross-sectional views of a substrate being patterned to form bulk metamaterial structures. FIG. 2A shows the bulk material, comprises, for example, a substrate 110. The bulk material may comprise, for example, glass or non-linear optical crystals. The material may comprise laser glass or solid-state laser materials. The substrate 110 may comprise or include, for example, piezoelectric or MEMS structures, or magnetic sensors. Other material are also possible.

A layer 111 of nano-particles 112 is deposited on the substrate or bulk material 110 as shown in FIG. 2B. In some implementations, the nanoparticles comprise spheres. In some implementations, the nanoparticles comprise polystyrene particles. In some cases, the nanoparticles comprises polystyrene spheres. The nanoparticles may have a dimension such as a width (e.g., average width), height (e.g., average height), diameter (e.g., average diameter), spacing (e.g., average spacing) etc., or any combination of these, for example, of 900 nm or less, 800 nm or less, 700 nm or less, 600 nm or less, 500 nm or less, 400 nm or less, 300 nm or less, 200 nm or less, 150 nm or less, 100 nm or less, 50 nm or less, 20 nm or less, 15 nm or less, 10 nm or less, or any range formed by any of these values or possibly larger or smaller.

The substrate 110 having nanoparticles 112 thereon can be exposed to an etching beam 114 comprising, for example, ions such as from an ion gun. The beam 114 can be used to etch material from the bulk 110 in regions of the substrate not covered by nanoparticles 112. The result is the formation of surface or topographical features 116 on the surface of the bulk material or substrate 110. These surface features 116 can have a nanometer dimension or dimensions such as height or average height, width or average width, spacing or average spacing, etc. The surface features 116 may have a dimension such as a width (e.g., average width), height (e.g., average height), diameter (e.g., average diameter), spacing (e.g., average spacing), etc., or any combination of these, for example, that is 900 nm or less, 800 nm or less, 700 nm or less, 600 nm or less, 500 nm or less, 400 nm or less, 300 nm or less, 200 nm or less, 150 nm or less, 100 nm or less, 50 nm or less, 20 nm or less, 15 nm or less, 10 nm or less, or any range formed by any of these values or possibly larger or smaller. These nanometer features 116 form a metamaterial structure in the bulk 110.

A variety of methods may be employed for the metasurface mask generation. As referred to above in connection with FIG. 2B, a layer 111 of nanoparticles 112 such as spheres may be formed on the surface of the substrate 110. In some implementations, a no-bake, spin-on process may be used to form the layer. Polystyrene spheres are NIST Traceable, particle size standards sized from 20 nanometers to 160 microns, which are highly accurate with a monodisperse particle size distribution, for example, suspended in a DI water solution potentially with a trace surfactant to reduce or minimize agglomeration. The spin-on process may utilize commercially available spin coating systems or otherwise.

Spin coating is a procedure used to deposit uniform thin films 111 onto flat substrates 110. A small amount of coating material can be applied on the center of the substrate 110, which is either spinning at low speed or not spinning at all. The substrate 110 is then rotated at speeds up to 10,000 rpm or possibly more to spread the coating material by centrifugal force.

Rotation is continued while the fluid spins off the edges of the substrate 110 until the desired thickness of the film 111 is achieved. The applied solvent is generally volatile and simultaneously evaporates. The higher the angular speed of spinning, the thinner the film 111. The thickness of the film 111 also depends on the viscosity and concentration of the solution as well as the solvent. In various implementations, the film 111 is a monolayer such as a non-conglomerated monolayer.

Figure 3:
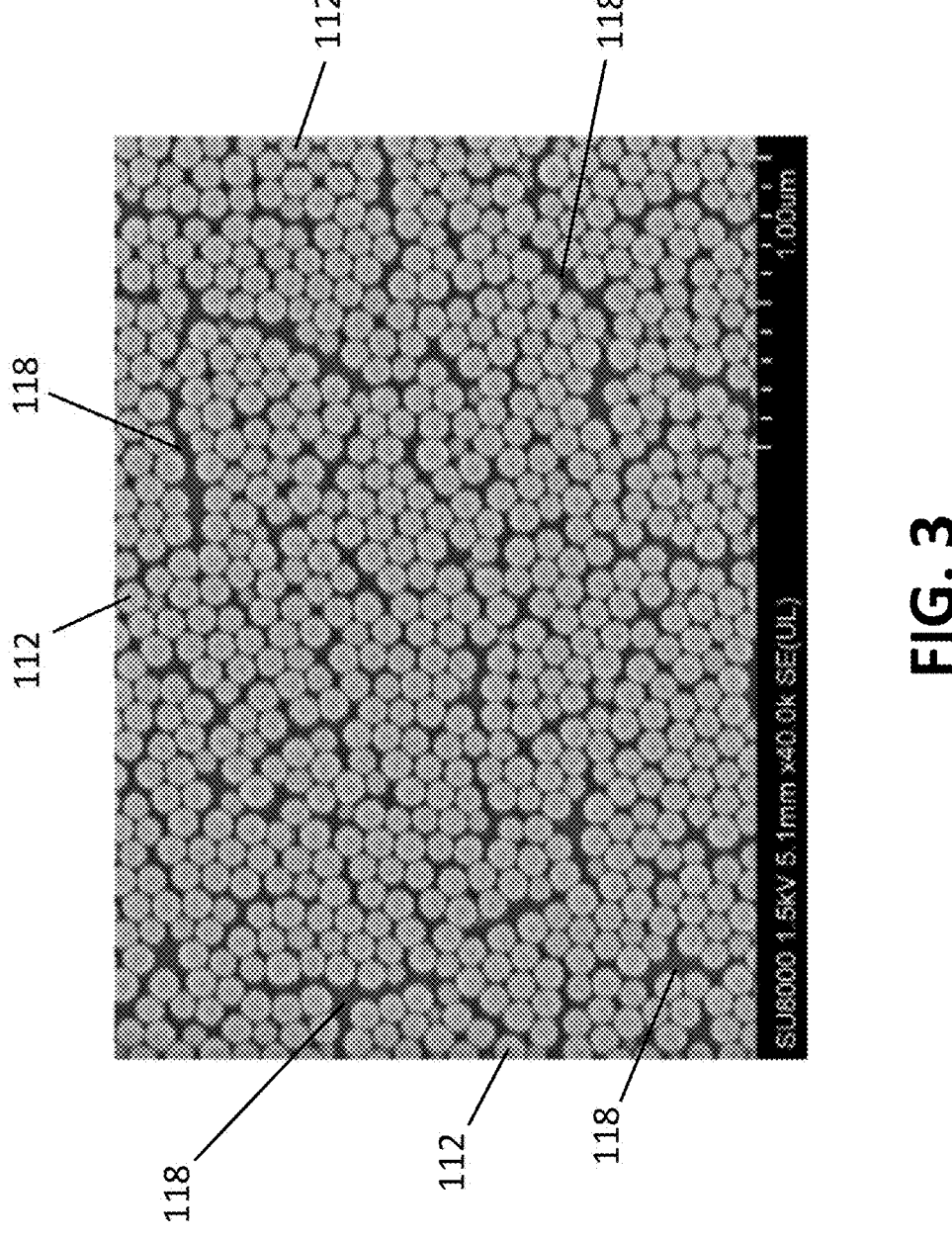
FIG. 3 is a scanning electron micrograph of a bulk material coated with spin-on polystyrene spheres.

A layer 111 of polystyrene nanoparticles 112 are shown in FIG. 3. FIG. 3 is a scanning electron micrograph of a sample coated with polystyrene spheres 112 using a spin-on polystyrene nanoparticle process. Gaps, spaces or interstices 118 between the nanoparticles 112 provide access of the etch beam 114 to the underlying material 110. The etch beam 114 can thus etch these portions of the material such as bulk material 110 not covered by the spheres/nanoparticles 112 thereby enabling patterning of the underlying material (e.g., bulk material) and formation of metamaterial features 116.

Other methods may be employed to form the layer 111 of nanoparticles 112. For example, the nanoparticle mask layer 111 may be formed via a Langmuir-Blodgett (LB) polystyrene nanoparticle process. The Langmuir (L), Langmuir-Blodgett (LB) and Langmuir-Schaefer (LS) techniques can enable fabrication of single nanoparticle thick films with control over the packing density of nanoparticles. When a monolayer is fabricated at the gas-liquid or liquid-liquid interface, the film is a Langmuir film. A Langmuir film can be deposited on a solid surface and is thereafter called Langmuir-Blodgett film (in the case of vertical deposition) or Langmuir-Schaefer film (in the case of horizontal deposition). Langmuir-Schaefer may be considered a variant of Langmuir-Blodgett deposition.

Figures 4A, 4B, 4C:
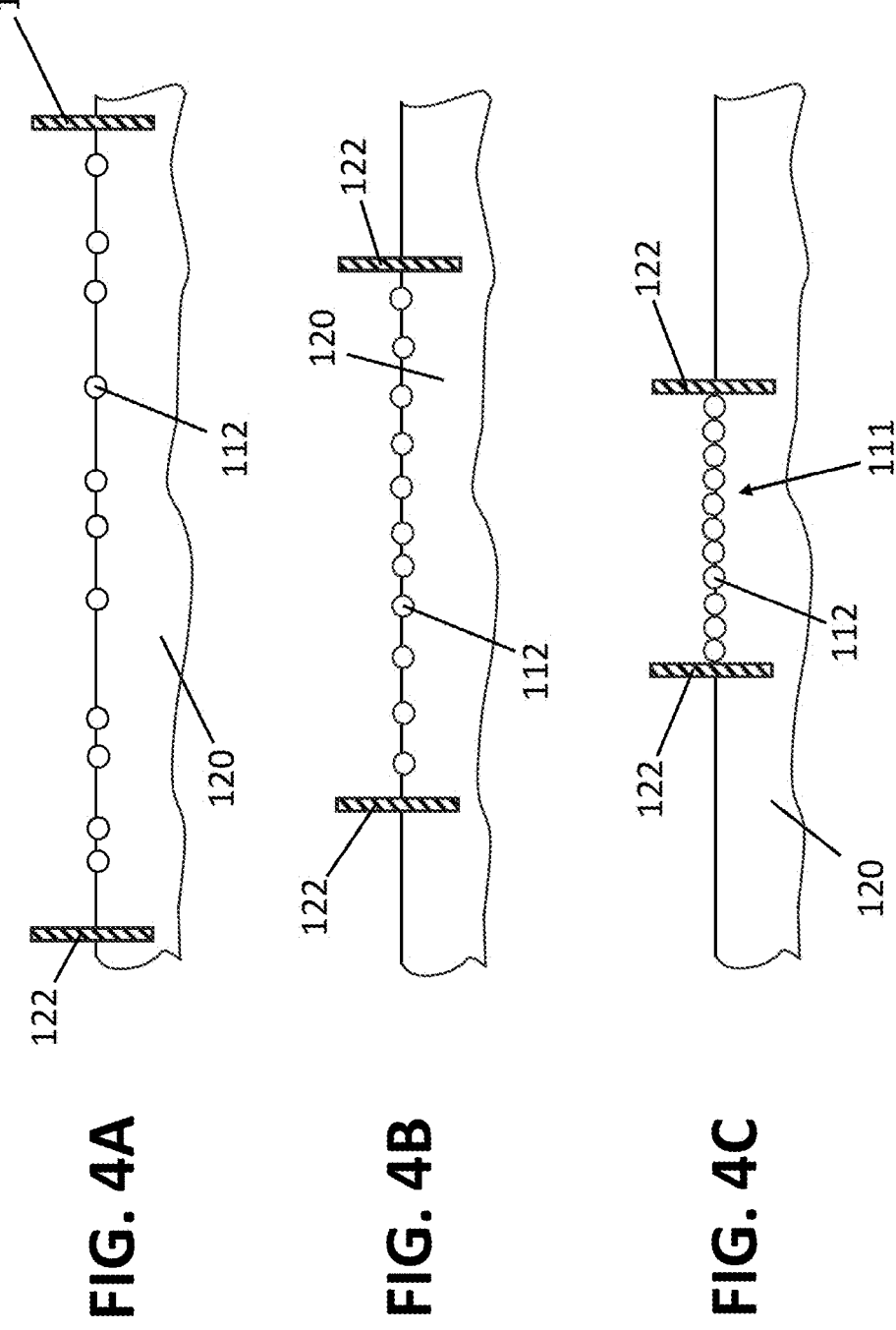
FIGS. 4A-4D are schematic cross-sectional views illustrating a Langmuir-Blodgett process for depositing a layer of nanoparticles such as polystyrene spheres.
Figure 4D:
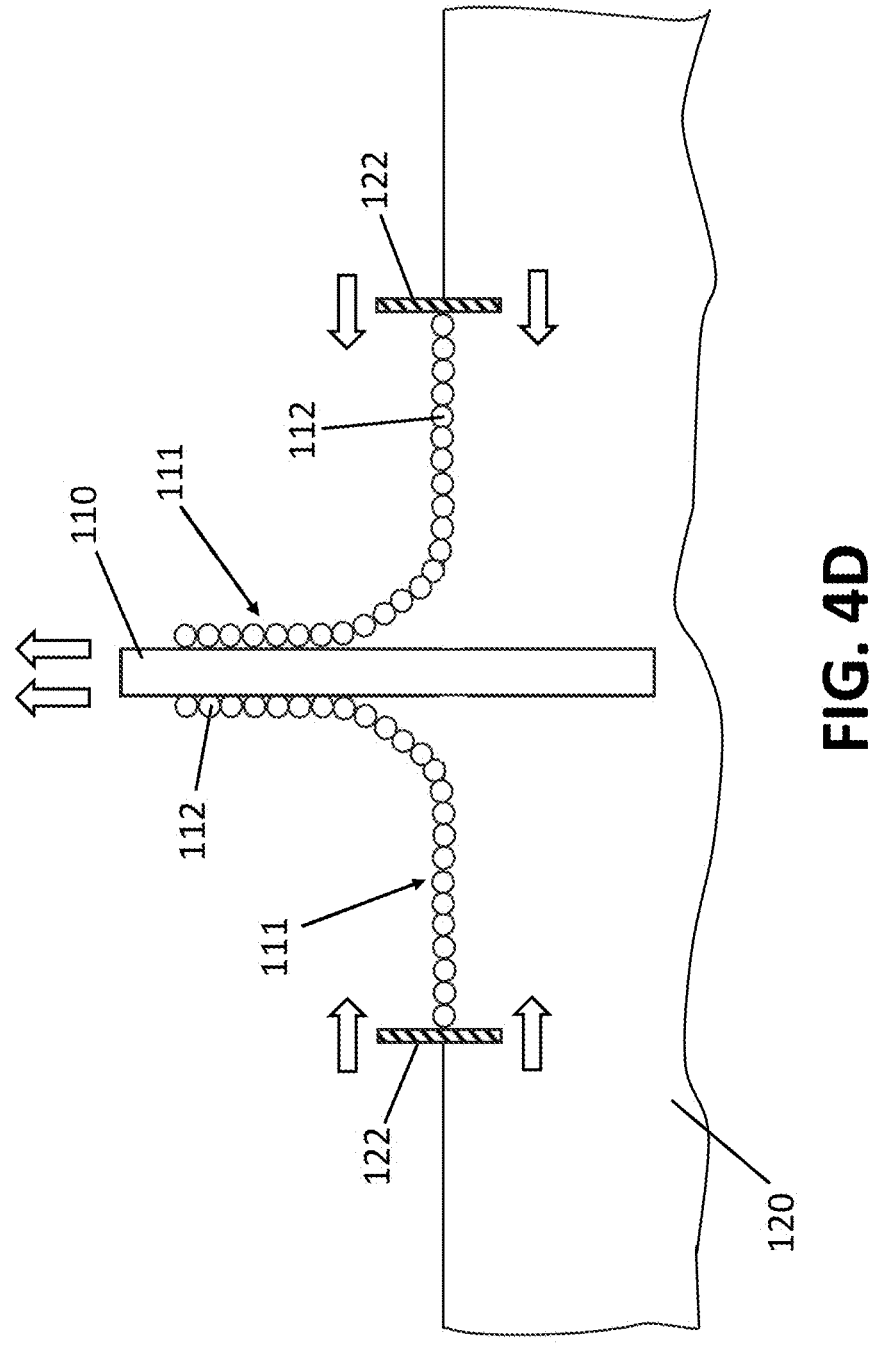

FIGS. 4A-4D schematically illustrate an example process for forming a Langmuir Blodgett film. FIG. 4A shows a plurality of nanoparticles 112 floating in a liquid 120. In some implementations, air is above the liquid. As shown in FIG. 4B, the nanoparticles 112 can be brought closer together by moving barriers 122 inward toward each other and compressing the plurality of nanoparticles 112 therebetween. A film 111 can thereby be formed as illustrated in FIG. 4C. This film Ill may be a monolayer thick in some implementations. The film 111 formed by assembling the plurality of nanoparticles 112 can be transferred to a substrate 110 by slowly extracting the substrate from the liquid 120 as illustrated in FIG. 4D. In some implementations, for example, the substrate 110 is dipped into the liquid 120 with the nanoparticles 112 formed thereon and as the substrate is pulled (e.g., vertically in this example) from the liquid 120, the nanoparticles 112 adhere to the surface of the substrate such as shown in FIG. 4D. Other processes and variations, however, may be employed. For example, other kinds of nanoparticles could be employed, both organic (like carbon)

and inorganic (like metals). In some cases, as the barrier are brought closer together to form the layer of nanoparticles, the nanoparticles' orientation of mobility becomes increasingly similar and/or their alignment to one another increases.

After the layer of nanoparticles 111 has been deposited or formed on the material, e.g., substrate or bulk material 110, a pattern may be transferred into the material (e.g., bulk material). In various implementations, the metasurface mask comprising the layer of nanoparticles 111, which in this example, comprises a plurality of polystyrene spheres, is employed to fabricate the metasurface structure in the material such as bulk material. Various techniques may be used to transfer the pattern into the material/bulk material. One such technique is reactive ion beam etching (RIBE) technology. RIBE is a specific technology using an ion beam source such as an ion gun. In various implementations of RIBE, a reactive gas is added to the ion beam source to inject a chemical etching component to the ion beam etching process. RIBE technology is different from the ICP, RIE, and PE technology in that the plasmas in RIE, ICP, and PE rely on substrate bias to attract and accelerate the ions whereas in RIBE the ions are accelerated remotely. RIE, ICP, and PE, for example, are configured for the sample to be between an anode and cathode. In contrast, in various implementations of RIBE systems, the substrate 110 is not between an anode and cathode used to generate or accelerate ions to the substrate.

Figure 5:
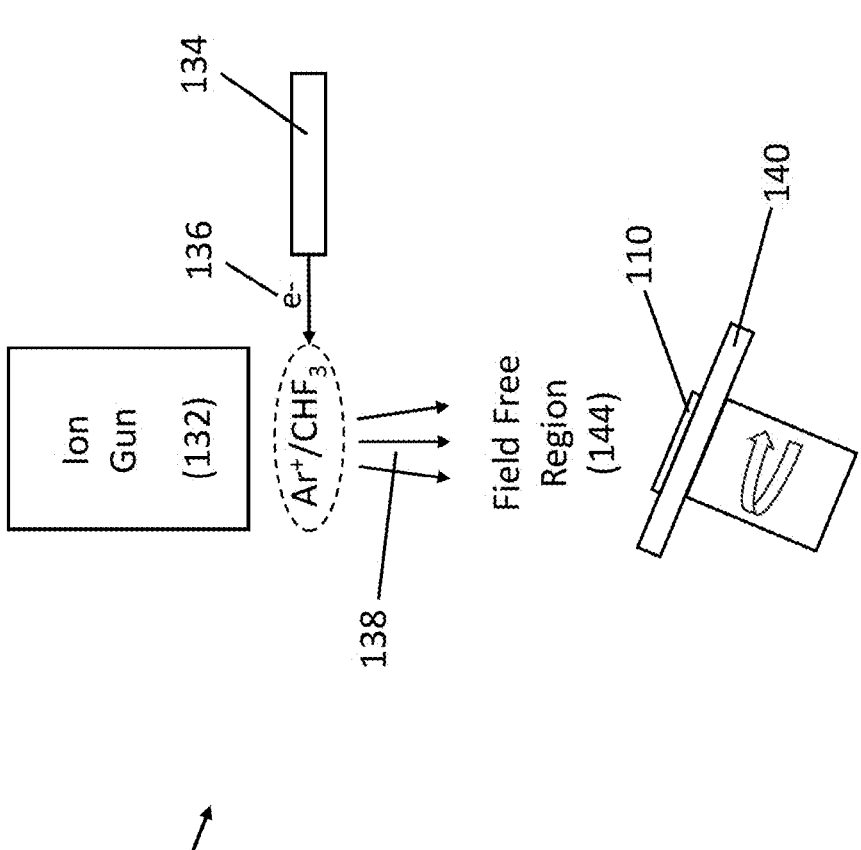
FIG. 5 is a schematic cross-sectional view illustrating a Reactive Ion Beam Etching (RIBE) system.

FIG. 5 shows an example Reactive Ion Beam Etching (RIBE) system 130. In this implementation, the RIBE system 130 comprises an ion source or gun 132, a neutralizer 134, and a sample stage 140. Ions are generated within the gun and then accelerated by the gun in the form of a beam 138 directed towards the substrate 110, which is supported on the substrate stage 140. In this example, the ions are shown as inert Argon (Ar) ions and reactive trifluoromethane ($CHF_3$) ions, however, other types of ions may be used. In this example, the neutralizer 134 emits a flux of electrons 136 to neutralize the ions after being emitted by the ion gun 132 and may thereby cause the substrate 110 to be electrically neutral. In various implementations, the sample stage 140 can provide a tilt, rotation, translation or any combination of these, which may potentially improve etch rates, etch uniformity, and/or reduce etching duty cycles.

Unlike various plasma etching techniques, the reactive ion beam etching system 130 shown in FIG. 5 does not situate the substrate 110 within an electric field that accelerates the ions toward the substrate. In various implementations, the ion source 10 and substrate 110 are independent in this regard. Once the ions are generated and accelerated from the ion source 140, the beam 138 is ballistic (e.g., as opposed to being charged ions in an electric field that continues to accelerate the charged ions toward the substrate 110). This arrangement allows flexibility to rotate and translate the substrate 110 to reduce etching duty cycle, and may reduce heating of the substrate. Heat may be reduced because the substrate 110 is not in the electric field. In contrast, RIE is predominantly a reactive volatile etch process where large reactive species concentrations are used to obtain sufficient etch rates. One way to achieve such high concentrations of reactive species concentrations is by increasing the E-field, thereby creating more heat.

In various implementations, for example, the RIBE process may maintain the substrate 110 at or below 30° C. while performing etching of the material, e.g., bulk material. In one example, the parameters of the RIBE process are the following:

Ion source beam voltage: <350 volts

Ion source beam current: <100 amps

Etching duty cycle (percent of temporal duration that substrate is being etch): <70%

Figure 6:
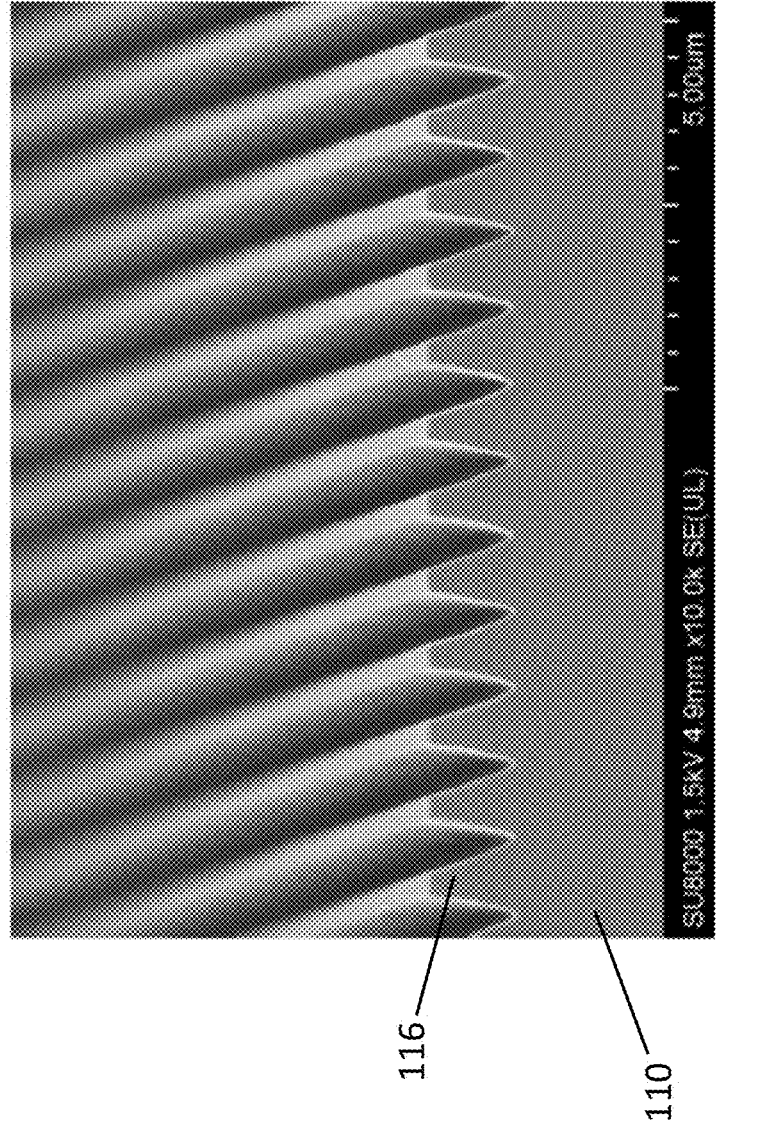
FIG. 6 is scanning electron micrograph of a ID metamaterial structure fabricated in heat-sensitive laser glass material.

An example bulk metamaterial structure 116 formed by depositing a monolayer of polystyrene spheres on the bulk material 110 and pattern transferring using a RIBE system is shown in FIG. 6. In particular, FIG. 6 is scanning electron micrograph of metamaterial structures 116 fabricated in bulk phosphate laser glass material 110 using a spin deposited polystyrene film as a mask and using RIBE to etch the bulk material. This entire process was performed at or below 30° C. The resultant bulk metamaterial structure 116 comprises elongate surface features having nanometer height, width, spacing and periodicity. This ID structure may potentially be used for spectral selectivity, wavefront and polarization control, the control of light radiation and detection, etc.

A wide variety of variations of the methods, processes, apparatus, devices and structures may be employed. For example, polystryrene nanoparticles need not always be employed. Other materials may be used. Similarly, the nanoparticles need not always be sphere. Other shapes are possible. Likewise, RIBE need not be the method relied upon for pattern transfer. Other etching or patterning processes and/or methods may be used. Likewise, the process need not always be performed at a temperature of 30° C. or less. However, in various implementations, the temperature of the material (e.g., bulk material) does not exceed 30° C. thereby reducing the incidence of thermal damage.

Other variations are also possible. For example, processing steps may be added, removed, or reordered. Similarly, structural components and/or features may be added, removed, or arranged or configured differently. For example, the nanoparticles need not be removed after etching although in various implementations nanoparticles are removed. Additionally, although various figures are discussed in connection with etching the bulk material of the substrate, in some cases, at least one layer of material is disposed on the substrate and that layer of material is etched to form the metamaterial structures therein.

EXAMPLES

This disclosure provides various examples of devices, systems, and methods of combining optical beam. Some such examples include but are not limited to the following examples.

Part I

1. A method of fabricating metamaterial structures at 30° C. or below, said method comprising:

forming a metasurface mask by depositing a layer of nanoparticles on a surface on a substrate;

etching said surface with said nanoparticles thereon using reactive ion beam etching (RIBE) thereby forming surface features on the surface; and removing at least a portion of said nanoparticles from said etched surface.

2. The method of Example 1, wherein said nanoparticles comprise spheres.

3. The method of Example 1 or 2, wherein said nanoparticles comprise polystyrene.

4. The method of any of the examples above, wherein said nanoparticles are from 1 to 500 nanometers wide.

5. The method of any of the examples above, wherein said nanoparticles are from 1 to 200 nanometers wide.

6. The method of any of the examples above, wherein said nanoparticles are from 20 to 160 nanometers wide.

7. The method of any of Examples 1-6, wherein said nanoparticles are deposited using a spin-on process.

8. The method of any of Examples 1-6, wherein said nanoparticles are deposited using a Langmuir (L), Langmuir-Blodgett (LB) or Langmuir-Schaefer (LS) process.

9. The method of any of the examples above, wherein said RIBE comprises generating ions with an ion gun and accelerating said ions toward the substrate.

10. The method of any of the examples above, wherein said RIBE further comprises neutralizing ions prior to the ions reaching the substrate.

11. The method of Example 10, wherein neutralizing ions comprise emitting a flux of electrons toward the ions.

12. The method of any of the examples above, wherein removing nanoparticles comprises removing most of said nanoparticles from said etched surface.

13. The method of any of the examples above, wherein removing nanoparticles from said etched surface comprises removing said layer of nanoparticles.

14. The method of any of the examples above, wherein removing nanoparticles from said etched surface comprises washing nanoparticles from said surface with a liquid.

15. The method of Examples 1-15, wherein said metamaterial structures are formed in glass.

16. The method of Examples 1-15, wherein said metamaterial structures are formed in material for a piezoelectric or MEMS device or assembly or magnetic sensor.

17. The method of Examples 1-15, wherein said metamaterial structures are formed in a non-linear optical crystal or solid-state laser material.

18. The method of Examples 1-15, wherein said metamaterial structures are formed in laser glass.

19. The method of any of the examples above, wherein the temperature of the substrate does not exceed 30° C. during the performance of this method of fabricating metamaterial structures.

20. The method of any of the examples above, wherein said surface features are formed by etching into said substrate.

21. The method of any of the examples above, wherein said substrate has at least one layer thereon and said surface on said substrate that is etched comprises a surface of said at least one layer on said substrate.

22. The method of any of the examples above, wherein metamaterial structures comprise bulk metamaterial structures formed in bulk material.

23. A metamaterial structure fabricated by the method of any of the examples above.

Part II

1. A method of fabricating metamaterial structures at 30° C. or below, said method comprising:

forming a metasurface mask by depositing a layer of polystyrene nanoparticles on a surface on a substrate;

etching said surface with said nanoparticles thereon thereby forming surface features on the surface; and removing at least a portion of said nanoparticles from said etched surface.

2. The method of Example 1, wherein said polystyrene nanoparticles comprises polystyrene spheres.

3. The method of any of Example 1 or 2, wherein said polystyrene nanoparticles are from 20 to 160 nanometers wide.

4. The method of any of Examples 1-3, wherein said nanoparticles are deposited using a spin-on process.

5. The method of any of Examples 1-3, wherein said nanoparticles are deposited using a Langmuir (L), Langmuir-Blodgett (LB) or Langmuir-Schaefer (LS) process.

6. The method of any of the examples above, wherein said etching said surface comprises generating ions with an ion gun and accelerating said ions toward the surface of the substrate.

7. The method of any of the example above, wherein removing nanoparticles comprises removing most of said nanoparticles from said etched surface.

8. The method of any of the example above, wherein removing nanoparticles from said etched surface comprises removing said layer of nanoparticles.

9. The method of any of the example above, wherein removing nanoparticles from said etched surface comprises washing nanoparticles from said surface with a liquid.

10. The method of Examples 1-9, wherein said metamaterial structures are formed in glass.

11. The method of Examples 1-9, wherein said metamaterial structures are formed in material for a piezoelectric or MEMS device or assembly or magnetic sensor.

12. The method of Examples 1-9, wherein said metamaterial structures are formed in a non-linear optical crystal or a solid-state laser material.

13. The method of Examples 1-9, wherein said metamaterial structures are formed in laser glass.

14. The method of any of the examples above, wherein the temperature of said substrate does not exceed 30° C. during the performance of this method of fabricating metamaterial structures.

15. The method of any of the examples above, wherein said surface features are formed by etching into said substrate.

16. The method of any of the examples above, wherein said substrate has at least one layer thereon and said surface on said substrate that is etched comprises a surface of said at least one layer on said substrate.

17. The method of any of the examples above, wherein metamaterial structures comprise bulk metamaterial structures formed in bulk material.

18. A metamaterial structure fabricated by the method of any of the examples above.

Part III

1. A method of fabricating metamaterial structures at 30° C. or less in temperature, said method comprising:
   forming a metasurface mask by depositing a layer of nanoparticles on a surface on a substrate;
   etching said surface with said nanoparticles thereon thereby forming surface features on the surface,
   where said the temperature of the substrate does not exceed 30° C. during the performance of this method of fabricating metamaterial structures.

2. The method of Example 1, wherein said nanoparticles comprise spheres.

3. The method of Example 1 or 2, wherein said nanoparticles comprise polystyrene nanoparticles.

4. The method of any of the examples above, wherein said etching said surface comprises generating ions with an ion gun and accelerating said ions toward said substrate.

5. The method of Examples 1-4, wherein said metamaterial structures are formed in glass.

6. The method of Examples 1-4, wherein said metamaterial structures are formed in material for a piezoelectric or MEMS device or assembly or magnetic sensor.

7. The method of Examples 1-4, wherein said metamaterial structures are formed in a non-linear optical crystal or a solid-state laser material.

8. The method of Examples 1-4, wherein said metamaterial structures are formed in laser glass.

9. The method of any of the examples above, further comprising removing at least a portion of said nanoparticles from said etched surface.

10. The method of any of the examples above, wherein said surface features are formed by etching into said substrate.

11. The method of any of the examples above, wherein said substrate has at least one layer thereon and said surface on said substrate that is etched comprises a surface of said at least one layer on said substrate.

12. The method of any of the examples above, wherein metamaterial structures comprise bulk metamaterial structures formed in bulk material.

13. A metamaterial structure fabricated by the method of any of the examples above.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. A method of fabricating metamaterial structures at 30° C. or less, said method comprising:

forming a metasurface mask by depositing a layer of nanoparticles on a surface on a substrate;

etching said surface with said nanoparticles thereon using reactive ion beam etching (RIBE) thereby forming surface features on the surface; and removing at least a portion of said nanoparticles from said etched surface, wherein the substrate has a temperature and the temperature of the substrate is maintained at or below 30° C. during both said deposition of said layer of nanoparticles on said surface on said substrate and said etching said surface with said nanoparticles thereon using said reactive ion beam etching.

2. The method of claim 1, wherein said nanoparticles comprise spheres.

3. The method of claim 2, wherein said nanoparticles comprise polystyrene spheres.

4. The method of claim 1, wherein said nanoparticles are from 1 to 200 nanometers wide.

5. The method of claim 1, wherein said nanoparticles are deposited using a spin-on process.

6. The method of claim 1, wherein said nanoparticles are deposited using a Langmuir (L), Langmuir-Blodgett (LB) or Langmuir-Schaefer (LS) process.

7. The method of claim 1, wherein said RIBE comprises generating ions with an ion gun and accelerating said ions toward the substrate.

8. The method of claim 1, wherein said RIBE further comprises neutralizing ions prior to the ions reaching the substrate.

9. The method of claim 8, wherein neutralizing ions comprises emitting a flux of electrons toward the ions.

10. The method of claim 1, wherein removing nanoparticles comprises removing most of said nanoparticles from said etched surface.

11. The method of claim 1, wherein removing particles from said etched surface comprises removing said layer of nanoparticles.

12. The method of claim 1, wherein removing particles from said etched surface comprises washing particles from said surface with a liquid.

13. The method of claim 1, wherein said metamaterial structures are formed in glass.

14. The method of claim 1, wherein said metamaterial structures are formed in material for a piezoelectric or MEMS device or assembly or a magnetic sensor.

15. The method of claim 1, wherein said metamaterial structures are formed in a nonlinear optical crystal or a solid-state laser material.

16. The method of claim 1, wherein said metamaterial structures are formed in laser glass.

17. The method of claim 1, wherein the temperature of the substrate does not exceed 30° C. in temperature during said removing said at least a portion of said nanoparticles from said etched surface.

18. The method of claim 1, wherein said surface features are formed by etching into said substrate.

19. The method of claim 1, wherein said substrate has at least one layer thereon and said surface on said substrate that is etched comprises a surface of said at least one layer on said substrate.

20. The method of claim 1, wherein metamaterial structures comprise bulk metamaterial structures formed in bulk material.

* * * * *